(12) United States Patent
Odenwald et al.

(10) Patent No.: US 6,223,240 B1
(45) Date of Patent: Apr. 24, 2001

(54) BUS BRIDGE ARCHITECTURE FOR A DATA PROCESSING SYSTEM CAPABLE OF SHARING PROCESSING LOAD AMONG A PLURALITY OF DEVICES

(75) Inventors: Louis Odenwald; Steve Schremmer, both of Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/494,477

(22) Filed: Jan. 31, 2000

Related U.S. Application Data

(63) Continuation of application No. 09/013,818, filed on Jan. 27, 1998, now Pat. No. 6,065,085.

(51) Int. Cl.⁷ .............................. G06F 13/00; G06F 13/40

(52) U.S. Cl. ........................... 710/129; 370/402; 710/128

(58) Field of Search .................................... 710/129, 128, 710/126, 101, 62, 2; 709/218, 250, 253, 301; 370/401, 402

(56) References Cited

U.S. PATENT DOCUMENTS

| 5,603,051 | * | 2/1997 | Ezzet . |
| 5,673,399 | * | 9/1997 | Guthrie et al. . |
| 5,771,387 | * | 6/1998 | Young et al. . |
| 5,884,027 | * | 3/1999 | Garbus et al. . |
| 5,898,888 | * | 4/1999 | Guthrie et al. . |
| 5,911,084 | * | 6/1999 | Jones et al. . |
| 6,065,085 | * | 5/2000 | Odenwald, Jr. et al. . |

* cited by examiner

Primary Examiner—Gopal C. Ray

(57) ABSTRACT

The method and apparatus provides a data processing system. The data processing system includes a primary bus, a secondary bus, and a host processor connected to the primary bus. The data processing system includes a first secondary processor connected to the primacy bus and the secondary bus. Additionally, a second secondary processor is connected to the secondary bus. The first secondary processor and the second secondary processor forms cascaded processors for input/output functions. Selected functions normally performed by the second secondary processor are performed by the first secondary processor, wherein a division of workload increases performance of the data processing system. This architecture allows shifting of workload down to the secondary bus.

19 Claims, 8 Drawing Sheets

BUS BRIDGE ARCHITECTURE FOR A DATA PROCESSING SYSTEM CAPABLE OF SHARING PROCESSING LOAD AMONG A PLURALITY OF DEVICES

This is a continuation of application Ser. No. 09/013,818 filed Jan. 27, 1998, U.S. Pat. No. 6,065,085.

BACKGROUND OF THE INVENTION

1. Technical Field

The present invention relates generally to an improved data processing system and in particular to a method and apparatus for an improved bus architecture in a data processing system. Still more particularly, the present invention relates to an improved method and apparatus for transferring data between devices on different buses within a data processing system.

2. Description of the Related Art

The use of a microprocessor and its associated bus architecture in a computer system is well known. Also well known is the coupling of peripheral components onto a bus for providing various other functions related to the computer system. Some examples of such devices are disk drives, disk drive controllers, graphics accelerators, audio cards, modems and network connections. Generally, these peripheral components are coupled to a system component bus, also referred to as a "secondary bus", for effecting data transfer between various components. Typically, with simpler computer systems, the data transfer is between the peripheral device and either the processor (CPU) or main memory.

In high performance computer systems, peripheral component interconnect (PCI) buses are often employed. The PCI bus is a high performance expansion bus architecture that was designed to replace the traditional ISA bus (Industry Standard Architecture bus) and EISA bus (Extended Industry Standard Architecture bus) buses found in many 886 based personal computers. A group of companies (including Intel, IBM, Compaq, DEC, Dell, NEC, etc.) cooperated in preparing and publishing a standard specification for the PCI bus. The specifications for the PCI bus is available from the PCI Special Interest Group, 5200 Elam Young Parkway, Hillsboro, Oreg.

In expanding the capacity of standard PCI, a "bus bridge", also referred to as a "PCI-to-PCI bridge", is employed. The primary function of such a bus bridge is to allow transactions to occur between a master device on one PCI bus and a target device on the other PCI bus. In this manner, the bus bridge provides system and adapter card designers an ability to overcome an electrical loading limits inherent in a standard PCI bus. A bus bridge has two interfaces, a primary interface and a secondary interface. The primary interface is the PCI interface of the bus bridge that is connected to the PCI bus closest to the central processing unit (CPU). The secondary interface is the PCI interface of the bus bridge that is connected to the PCI bus that is farthest from the CPU. Under the PCI bridge specifications, each of the interfaces are capable of either a master or target operation. With respect to the bus which initiates an operation, the bus bridge functions as a target on behalf of the target device that actually resides on the target bus. Likewise, with respect to the target bus, the bus bridge functions as a master on behalf of the master device that actually resides on the initiating bus.

In FIG. 1, a block diagram of a known data processing system architecture is illustrated. Data processing system 100 is a data processing system following the Intelligent Input/Output ($I_2O$) Architecture Specification, version 1.5, March 1997 available from the $I_2O$ Special Interest Group. The specification describes an open architecture for developing device drivers in network system environments. The architecture is independent of the operating system (OS), processor platform, and system I/O bus.

Data processing system 100 is an example of an intelligent input/output ($I_2O$) architecture which includes a host central processing unit (CPU) 102 which could be a Pentium processor that is available from Intel Corporation located in Santa Clara, Calif. In an $I_2O$ architecture, the host CPU 102 is responsible for running the various operating system modules (OSMs). In this example, the primary bus 104 is a PCI bus and provides communication between the host CPU 102, an input/output processor (IOP)/PCI bridge 106 and IOP 108. The IOP/PCI bridge 106 is intended to be a $I_2O$ core compliant device such as Intel's i960. The IOP/PCI bridge 106 also contains a PCI-to-PCI bridge which bridges the primary bus 104 to the secondary bus 110, which in this example is also a PCI bus. Adapter #1 112 and adapter #2 114 are also attached to the secondary bus 110. Adapters 112 and 114 are non-intelligent, meaning that they contain no processor, and are reliant on external processing power to run their device drivers, or hardware driver module (HDM) in $I_2O$ terminology. In this example, both of these adapters' (112 and 114) HDMs are actually running on the IOP/PCI bridge 106. IOP 108 is an example of an $I_2O$ shell compliant device and is an intelligent adapter such as Symbios' SYMFC920. IOP 108 is specifically designed as an integral part of adapter #3 and is responsible for running adapter #3's HDM.

In a data processing system, such as the example system described in FIG. 1, in which there resides an IOP/PCI bridge and one or more additional IOPs it would be prudent to architect the system in such a way as to utilize more than one IOP on a given I/O transaction. Although bus bridges solve electrical loading limits inherent in standard PCI buses and $I_2O$ offloads many I/O related tasks from the host CPU down to the various IOPS, there are still architectural issues when dealing with multiple inter-operating IOPs. Therefore, it would be advantageous to develop a simple method for allowing IOPs to inter-operate, share resources and distribute roe workload in such systems.

SUMMARY OF THE INVENTION

The present invention provides a data processing system. The data processing system includes a primary bus, a secondary bus, and a host processor connected to the primary bus. The data processing system includes a first secondary processor/bridge connected to the primary bus and the secondary bus. Additionally, a second secondary processor is connected to the secondary bus. The first secondary processor/bridge and the second secondary processor forms cascaded processors for input/output functions. Selected functions normally performed by the second secondary processor are performed by the first secondary processor/bridge, wherein a division of workload increases performance of the data processing system.

The first secondary processor/bridge also provides communication between the primary bus and the secondary bus. Through the secondary processor, workload may be shifted to the secondary bus increasing the bandwidth on the primary bus.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
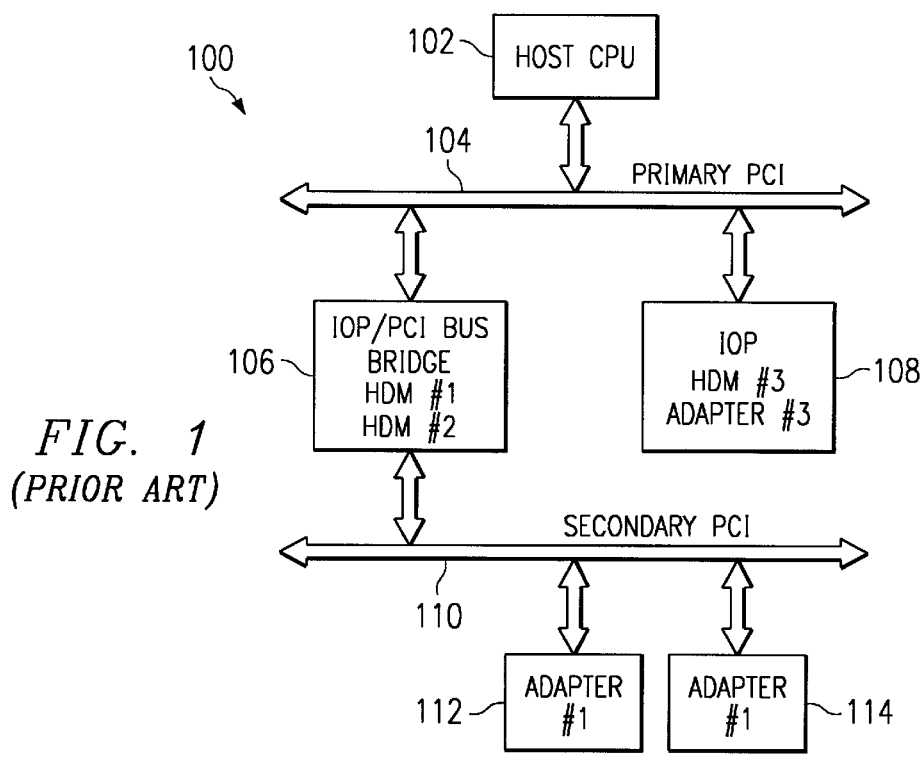
FIG. 1 is a block diagram of a known data processing system architecture.
Figure 2:
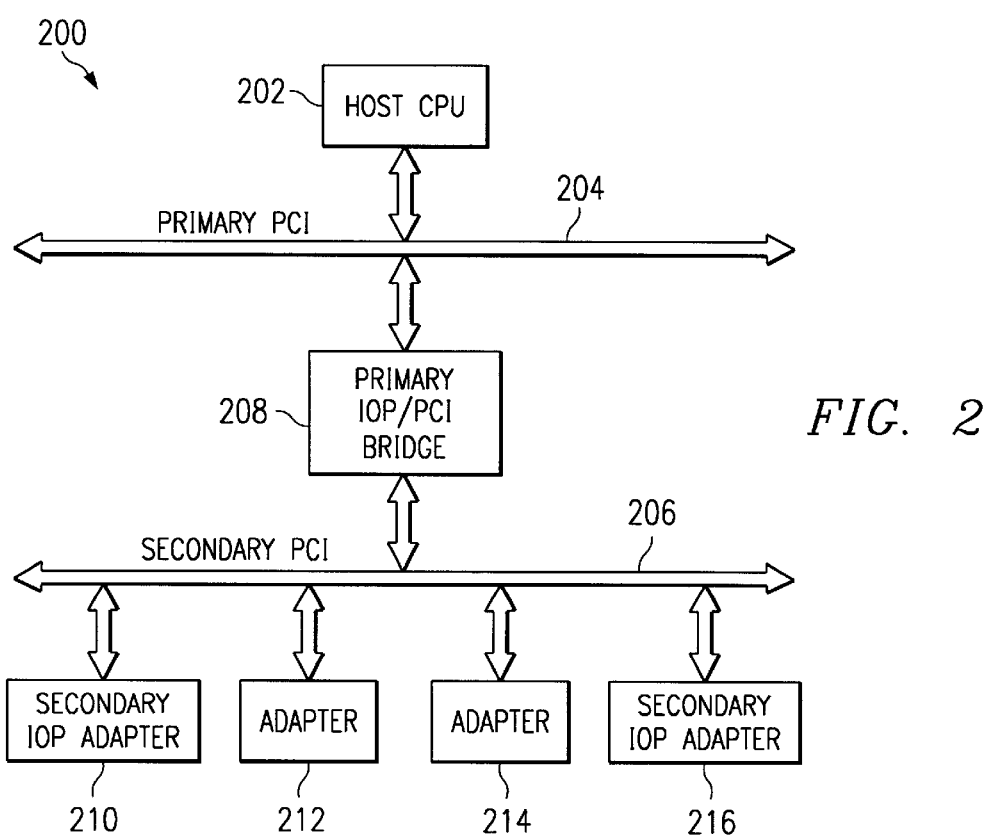
FIG. 2 is a block diagram of a data processing system in accordance with a preferred embodiment of the present invention.

With reference now to the figures and in particular to FIG. 2, a block diagram of a data processing system is depicted in accordance with a preferred embodiment of the present invention. Data processing system 200 includes a host 202, which may include one or more processors, which form the CPU or CPUs for data processing system, 200. Data processing system 200 is a data processing system designed along the Intelligent Input/Output ($I_2O$) Architecture Specification, version 1.5, March 1997 available from the $I_2O$ Special Interest Group, which is incorporated herein by reference. The present invention, however, may be implemented using other system architectures.

The processors within host 202 may be, for example, a Pentium II processor operating at 300 Mhz, which is available from Intel Corporation and Santa Clara, Calif. In the depicted example, primary bus 204 and secondary bus 206 are PCI buses although the present invention may be implemented using other types of buses.

Still referring to FIG. 2, data processing system 200 includes a primary input/output platform (IOP) 208, which is connected to host 202 by primary bus 204. Additionally, IOP 208 is connected to secondary bus 206 and also functions as a PCI-to-PCI bus bridge. Data processing system 200 also includes adapter 212 and adapter 214. Secondary IOPs 210 and 216 are intelligent adapters under $I_2O$ and secondary IOP 210 and secondary IOP 216 contain input/output processors. Adapters 212 and 214 are non-intelligent adapters, which do not contain input/output processors.

The present invention provides an improved method and apparatus for handling transactions and functions within data processing system 200 through the use of primary and secondary IOPs. More specifically, communications are provided between primary input/output processor in IOP 208 and the secondary input/output processors in IOPs 210 and 216. Additionally, the present invention also provides for sharing of tasks or functions between primary IOP 208 and the secondary IOP 210 or IOP 216.

Figure 3:
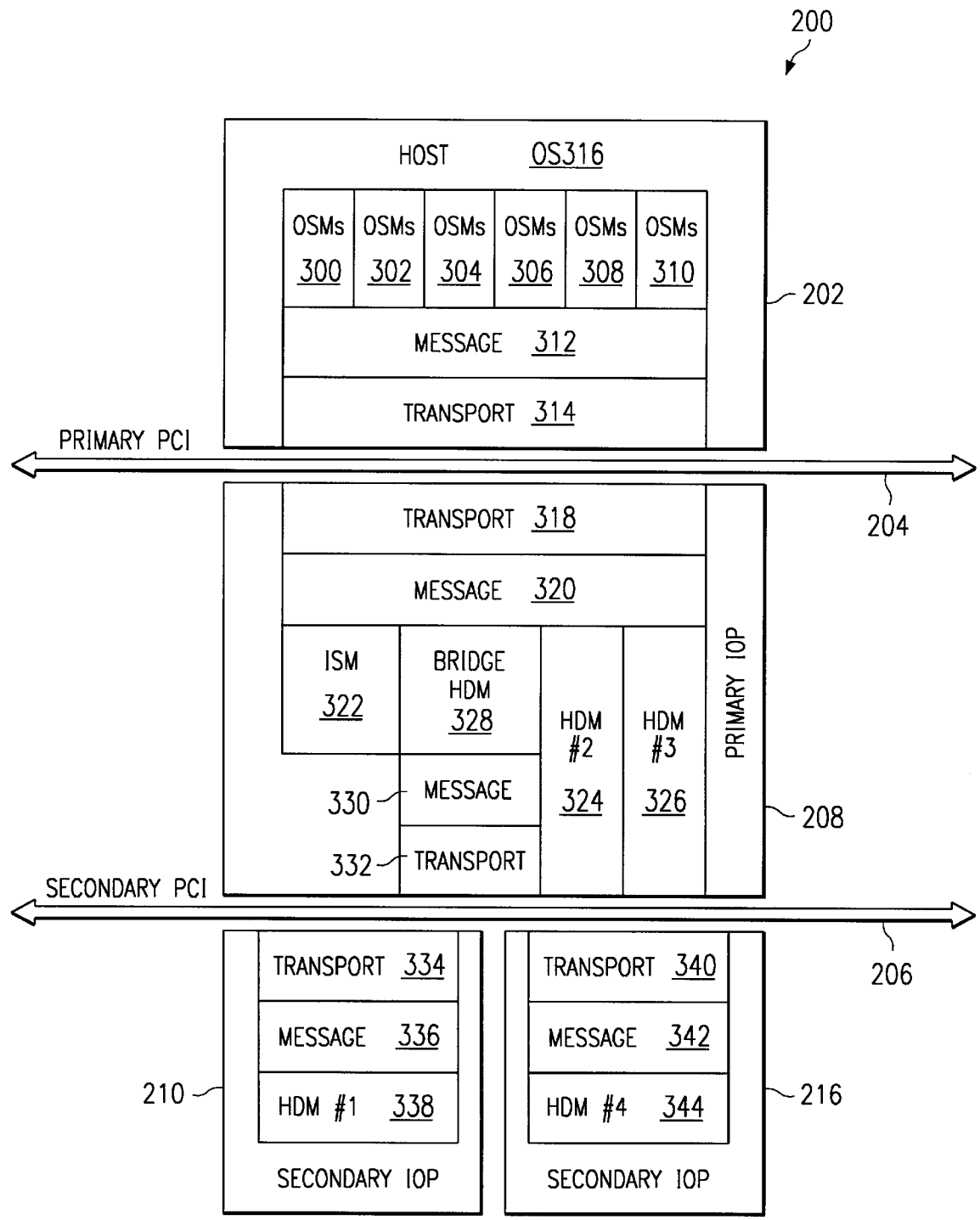
FIG. 3 is a block diagram of software units within portions of the data processing system in accordance with a preferred embodiment of the present invention.

Turning now to FIG. 3, a block diagram of software units within portions of the data processing system in FIG. 2 is depicted in accordance with a preferred embodiment of the present invention. In the depicted example, the present invention provides communications between devices within data processing system 200 using a standard architecture for intelligent input/output called the $I_2O$ Specification by the Intelligent I/O Special Interest Group ($I_2O$ SIG). This specification defines an architecture for intelligent input/output that is independent of both the specific device being controlled and the host operating system. $I_2O$ defines a standard architecture for intelligent input/output, an approach to input/output in which low level interrupts are offloaded from the CPU to I/O processors designed specifically to handle input/output. With support for message-passing between multiple independent processors, the $I_2O$ architecture relieves the host of interrupt-intensive input/output tasks, greatly improving input/output performance in high-bandwidth applications such as networked video, groupware, and client/server processing. $I_2O$ imposes no restrictions on where layered modules execute, providing support for single processor, multiprocessor and clustered systems. The $I_2O$ Specification is available from $I_2O$ Special Interest Group located at 404 Balboa Street, San Francisco, Calif. 94118. Host 202 includes a number of operating system modules (OSMs) 300, 302, 304, 306, 308, and 310. An OS-specific module (OSM) is an upper module that provides the interface to the operating system. Typically, the OS vendor supplies this module, which contains no hardware-specific code. Host 202 also includes a message layer 312, a transport layer 314, and host operating system 316. Primary IOP 208 includes a transport layer 318, a message layer 320, intermediate service module (ISM) 322, hardware device module (HDM) #2 324, hardware device module (HDM) #3 326, and bridge HDM 328. The hardware device module (HDM) is a lower module that provides the interface to the I/O adapter and its devices. The hardware vendor supplies this module, which contains no operating system (OS) specific code. The intermediate service module (ISM) results from splitting the device driver more than once, or adding functionality between the OSM and HDM, creating stackable drivers. This places one or more of these intermediate modules between the OSM and HDM. An independent software vendor can supply ISMs. HDMs and ISMs are often referred to collectively as device driver modules or DDMs, because, in many aspects, their behavior is identical. This is especially true from the viewpoint of the host OS. Bridge HDM 328 also has a message layer 330 and a transport layer 332 associated therewith.

IOP 210 contains a transport layer 334, a message layer 336, and a HDM #1 338. IOP 216 contains a transport layer 340, a message layer 342, and a HDM #4 344. The OSMs within host 202 provide an interface to host operating system 316 on host 202 and message layer 312. These OSMs translate requests from host operating system 316 into messages that can be dispatched to the appropriate device driver module (DDM) for processing. Device driver module (DDM) information is forwarded back to host operating system 316 through the OSMs via the message layer 312.

The HDMs in primary IOP 208 and secondary IOPs 210 and 216 are the lowest level modules in the depicted example. These HDMs provide the device-specific portion of the device driver that will interface with the particular controller and devices. HDMs are roughly analogous to the hardware-specific portion of the network and SCSI drivers that exist today. The HLM translation layer is unique to each individual hardware device and vendor, and supports a range of operation types, including synchronous and asynchronous requests, and event-driven and polled transactions.

The message layers provide a mechanism for communication between various modules within data processing system 200 in FIG. 3. These message layers manage and dispatch all requests and provide a set of application programming interfaces (APIs) for delivering messages, along with a set of support routines that process them. Each message layer includes a message handle, a message service routine (MSR), and a message queue. The message queue provides a link between the requestor and the desired service.

The present invention provides bridge HDM 328 including message layer 330 and transport layer 332 to provide a mechanism for communication with IOPs 210 and 216. In particular, bridge HDM 328 provides communications between primary IOP 208 and an HDM 338 and HDM 344 in IOPs 210 and 216, respectively. This bridge HDM executes along with HDMs 324 and 326 within primary IOP 208. In summary, bridge HDM 328 is responsible for managing messaging and transport layers, which interface with all IOPs found on secondary bus 206. Further, the present invention employs an ISM such as ISM 322 to perform functions normally executed on IOP 210 or IOP 216. In this manner, the workload is split between two IOPs, increasing efficiency and performance with data processing system 200.

Figure 4A:
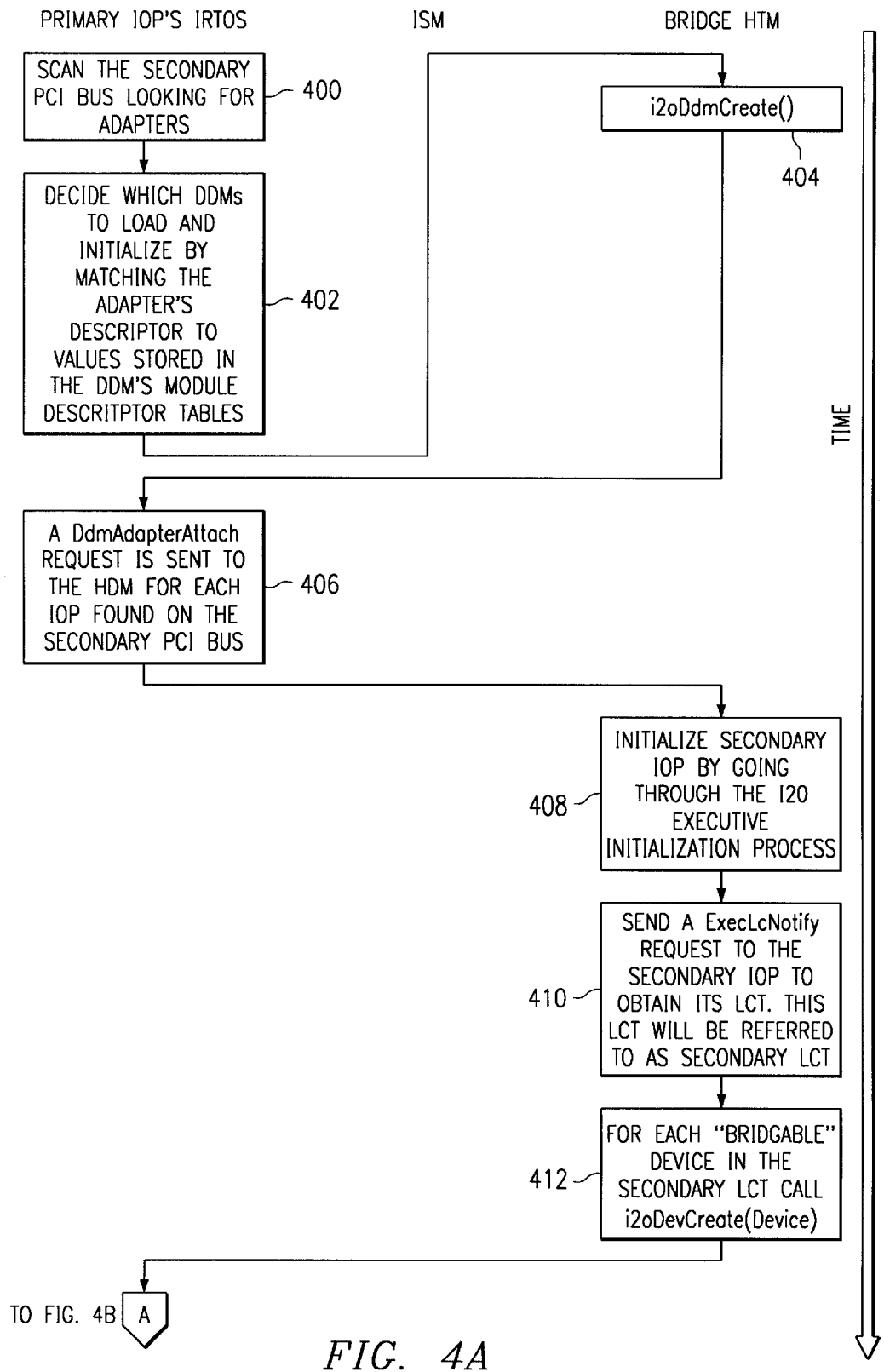
FIGS. 4A and 4B are flowcharts of a process for loading and initializing a bridge hardware device module in accordance with a preferred embodiment of the present invention.
Figure 4B:
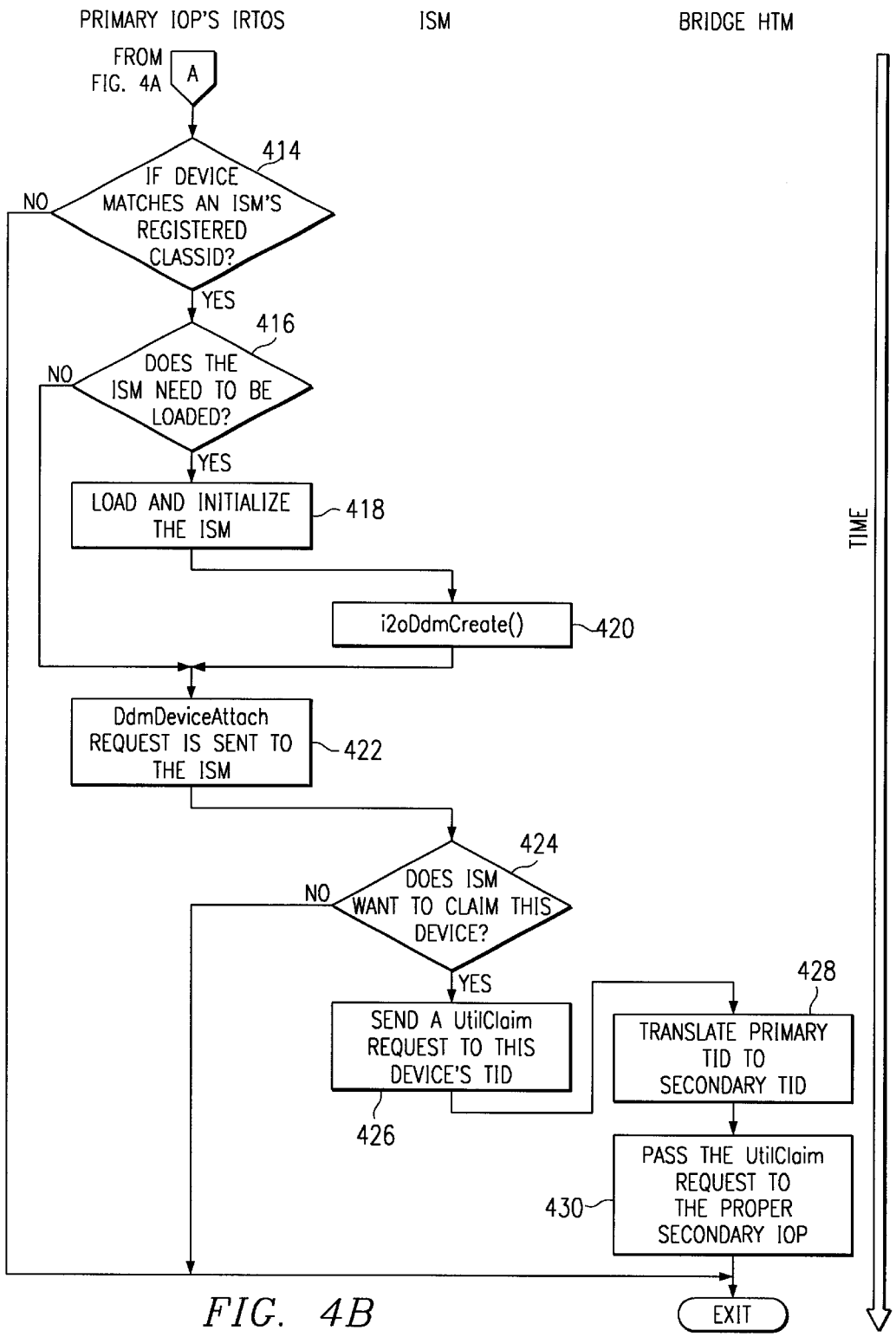

Turning now to FIGS. 4A and 4B, are flowcharts of a process for loading and initializing a bridge hardware device module is depicted in accordance with a preferred embodiment of the present invention The process begins with the intelligent input/output real time operating system (IRTOS) in the primary IOP scanning the secondary bus looking for adapters (step 400). IRTOS is a special purpose real time operating system designed to support high speed, low overhead input/output operations. The IRTOS in the primary IOP looks for IOP devices or adapters on the secondary bus. The process then determines which HDMs to load and initialize by matching an adapter's description to values stored in the HDMs module descriptor tables, which contains information describing the HDM and lists the types of adapters and devices that the HDM can control (step 402).

The bridge HDM initializes and calls i2oDdmCreate() to create a logical configuration table (LCT) entry for itself (step 404). Each entry in an IOP's logical configuration table contains a SubClassInfo word. The structure of this word is defined by each class and identifies the major capabilities of the device. When the DDM registers a device, it provides the information for the LCT entry such as the device's ClassID and SubClassInfo. The IOP publishes this information in its logical configuration table, and the OSM uses this information when it determines which devices to query. Thereafter, the IRTOS sends DdmAdapterAttach requests to the HDM for each IOP found on the secondary PCI bus (step 406). In step 406, the IRTOS sends a DdmAdapterAttach message to the bridge HDM for each IOP on the secondary bus.

Thereafter, the bridge HDM, in response to receiving the DdmAdapterAttach message initializes the secondary IOP using the I₂O executive initialization process (step 408). After the secondary IOP has been initialized, the bridge HDM sends an ExecLctNotify request message to the secondary IOP to obtain the LCT for the secondary IOP (step 410). This LCT for the secondary IOP is also referred to as the "secondary LCT". For each device in the secondary LCT that needs to be "bridged", i2oDevCreate() is called to register the device and create a new LCT entry in the primary LCT located in the primary IOP and to set up event handlers for the request messages (step 412). Most of the fields in the new LCT entry would be the same as if they were located in the secondary LCT. For example, fields such as, ClassID and SubClassInfo would be the same.

Next, the IRTOS in the primary IOP determines whether the device identified in the new LCT entry matches the ClassID for which an ISM is registered (step 414). If the device identified in the new LCT entry does not match the ClassID, the process terminates. Otherwise, a determination is made by the IRTOS as to whether the ISM needs to be loaded (step 416). If the ISM is to be loaded, the IRTOS then loads and initializes the ISM (step 418). After the ISM is loaded and initialized, the ISM calls i2oDdmCreate() to the IRTOS (step 420). In response, the IRTOS sends a DdmDeviceAttach message to the ISM for each matching device in the primary LCT (step 422). In response to these requests, the ISM determines whether it is to claim the device identified by the request (step 424). If the ISM claims the device, a UtilClaim is sent by the ISM to the device's target identifier (TID) (step 426).

Thereafter, the bridge HDM translates messages sent to the primary TID and sends them to the secondary TID on the secondary IOP (step 428). The translated message is then passed to the proper TID on the secondary IOP (step 430) with the process terminating thereafter.

Figure 5A:
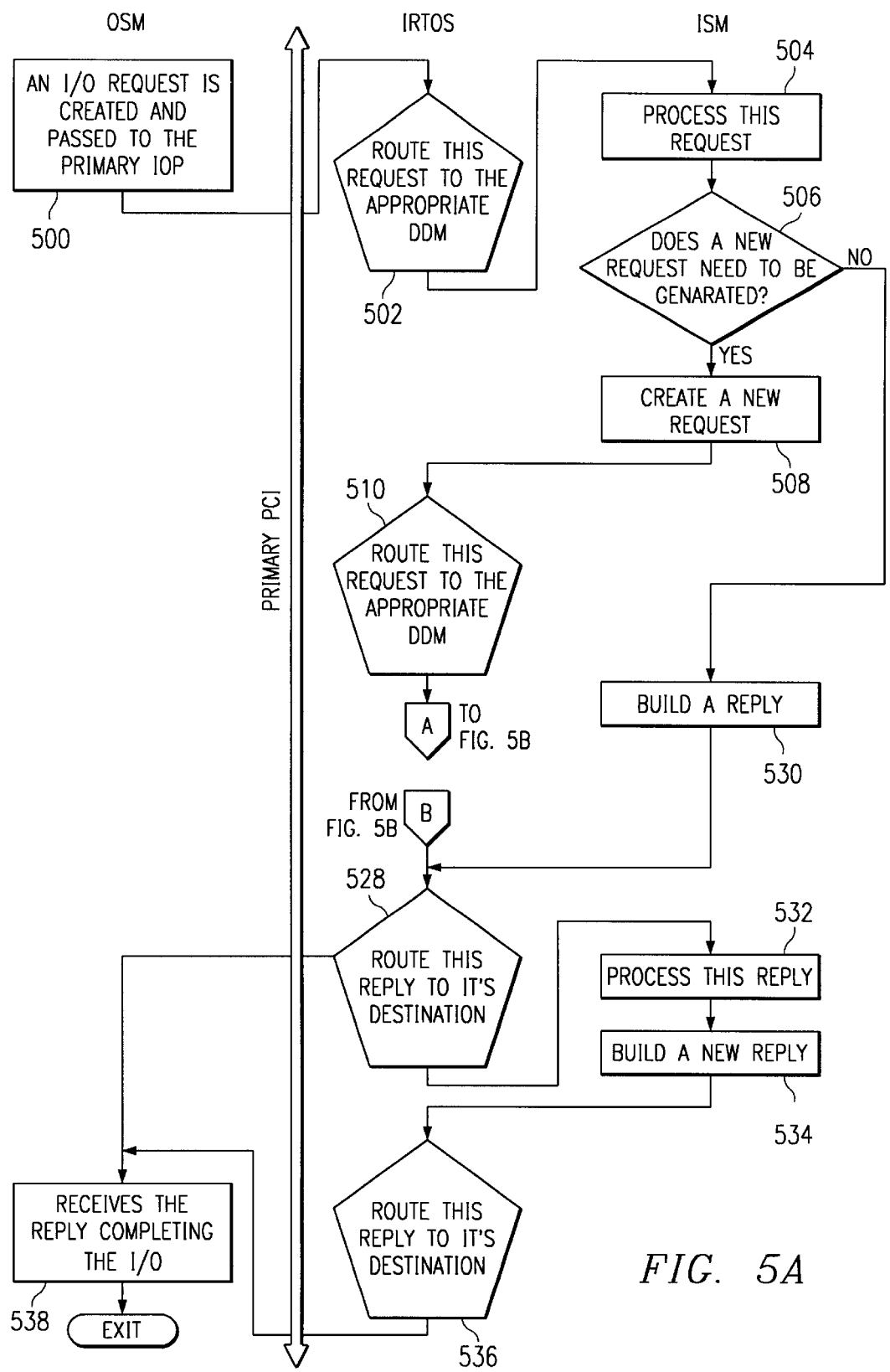
FIGS. 5A and 5B are flowcharts of a process for messaging handling in accordance with a preferred embodiment of the present invention.
Figure 5B:
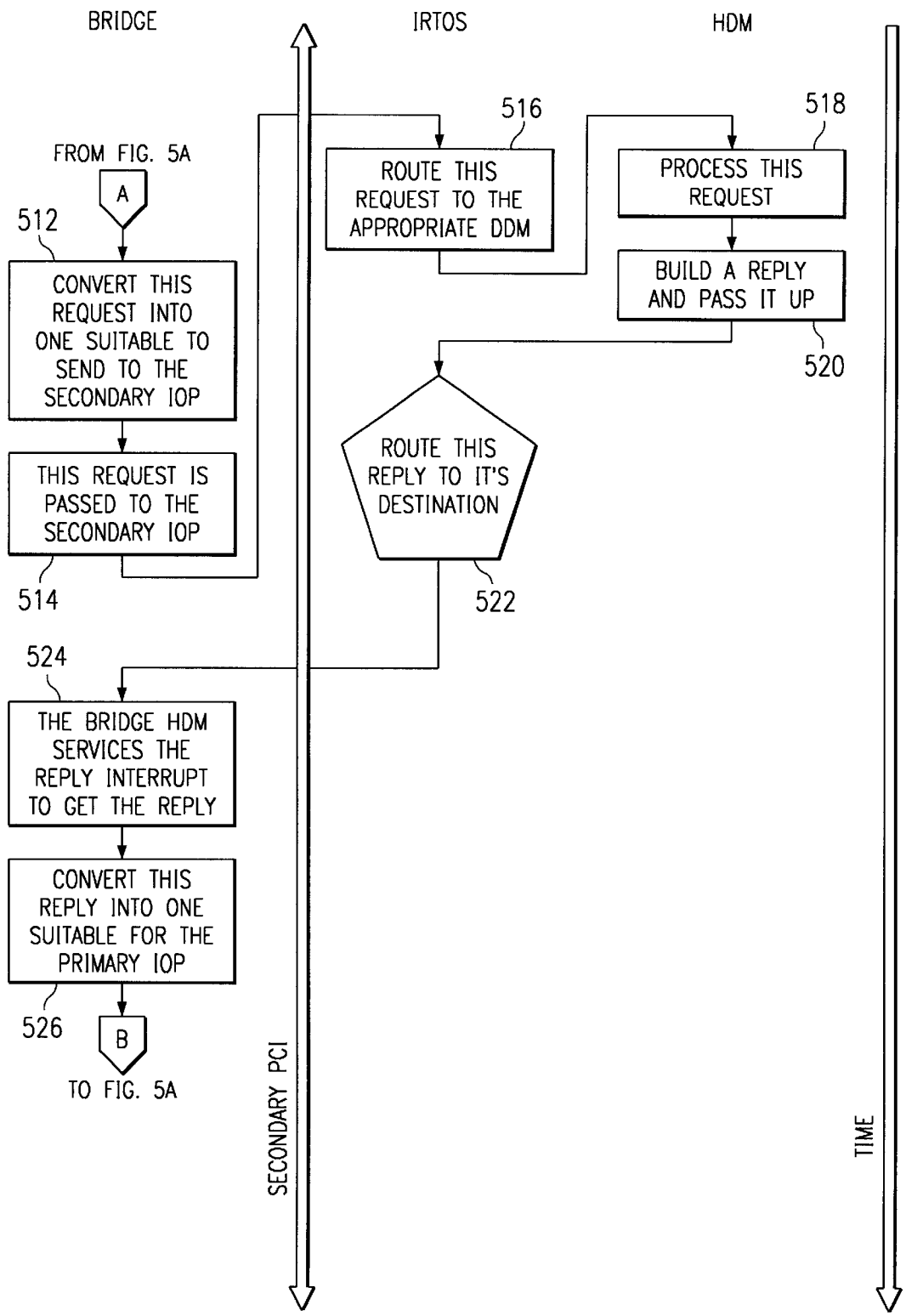

With reference now to FIGS. 5A and 5B, are flowcharts of a process for messaging handling is depicted in accordance with a preferred embodiment of the present invention. The operating system module (OSM) creates an I/O request message and passes it to the primary IOP (step 500). The host is the initiator of the message and the device registered by the ISM is the target. This request is sent across the primary PCI bus to the IRTOS in the primary IOP. Thereafter, the IRTOS in the primary IOP routes the request to the proper function handler in the appropriate DDM (step 502). The routing is based on the target address and the function code located in the message header of the request.

The ISM then processes the request (step 504) and determines if a new request should be generated and passed to devices controlled by the bridge HDM (step 506). If a new request is to be generated, the ISM then generates the new request (step 508). The ISM is the initiator of this new request with the HDM device being the target of this new request. This request is then routed by the IRTOS to the proper function handler in the bridge HDM (step 510).

Next, the bridge HDM takes the request and converts it into one that is suitable to be sent to the secondary IOP (step 512). In step 512, the function handler in the bridge HDM converts the message header to be suitable for passing to a secondary IOP. This conversion is made based on the device context that the IRTOS has passed with the message. At the very least, the initiator address is changed to an I2O HOST TID because the bridge HDM is acting as the host for the secondary IOP. Thereafter, the bridge HDM passes the request to the secondary IOP by reading the inbound FIFO register on the secondary IOP to obtain a request message frame address (MFA) and then copying the request into the message frame and writes the MFA back to the inbound FIFO register (step 514). In assuming the role or the host, the bridge HDM inserts the I₂O host TID into the initiator field of this request with the target being the HDM in the device (secondary IOP) on the secondary PCI bus.

The IRTOS on the secondary IOP routes the request message to the proper function handler in the HDM on the secondary IOP (step 516). The HDM on the secondary IOP processes the message and takes any action to satisfy the request (step 518). The HDM on the secondary IOP generates an appropriate reply message and passes it to the IRTOS in the secondary IOP (step 520). The host is the initiator of this reply with the target being the HDM in the secondary IOP. In response to receiving the reply, the IRTOS in the secondary IOP routes the reply to its destination (step 522). This destination is the initiator and since the message has an initiator address of $I_2O$ HOST TID, the IRTOS will route the reply back to its host, which is the primary IOP. This routing is accomplished by copying the reply to a valid reply MFA (memory on the primary IOP) and then writing this MFA to the outbound FIFO register of the primary IOP, which generates an interrupt to the primary IOP. The routing of this message is across the secondary PCI bus to the bridge HDM in the primary IOP.

Thereafter, the bridge HDM services the reply interrupt to obtain the reply, which occurs by reading the outbound FIFO register on the secondary IOP to get the reply MFA (step 524). This reply is converted by the bridge HDM into one suitable for use by the primary IOP (step 526). The ISM is the initiator of this converted reply with the target being the HDM device. The reply is for the request received by the IRTOS back in step 510. The IRTOS then routes the reply to its destination (step 528). In the depicted example, the destination is the ISM in the primary IOP. With reference again to step 506, if the ISM determines that a new request should not be generated, then a reply is built (step 530) with the IRTOS routing the reply back to the host as described in step 528. The reply in step 530 has the host as the initiator and the target as the ISM in the device.

After the IRTOS routes the reply to the ISM, the ISM processes the reply (step 532) and eventually creates a new reply to the original request from the OSM (step 534). With respect to this reply, the initiator is the host with the target being the ISM device. The reply is then routed by the IRTOS to its destination, the host (step 536). This reply is routed across the primary PCI bus. The OSM and the host receives the reply completing the input/output message handling (step 538) with the process terminating thereafter.

Figure 6:
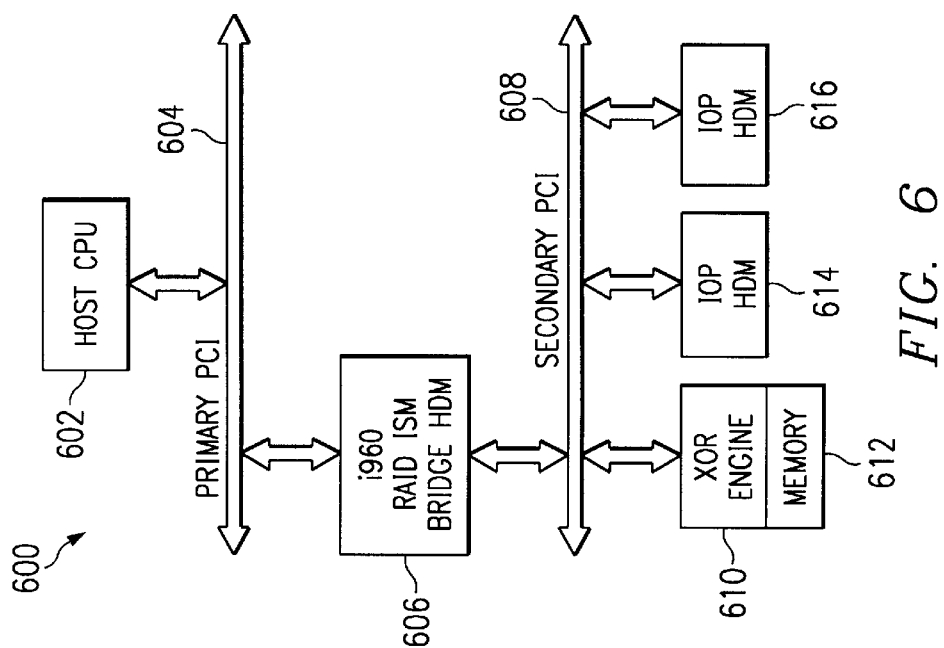
FIG. 6 is a block diagram of a RAID implementation in a data processing system in accordance with a preferred embodiment of the present invention.

Turning now to FIG. 6, an upper level block diagram of a RAID implementation in a data processing system is depicted in accordance with a preferred embodiment of the present invention. In data processing system 600, tasks are split up between a primary IOP and secondary IOPs to increase performance of the data processing system. In particular, some tasks in the RAID implementation are implemented on the primary IOP rather than solely on a secondary IOP.

In the depicted example, data processing system 600 includes a host processor 602 in the form of a Pentium II processor connected to a primary PCI bus 604. Primary IOP 606 also acts as a bus bridge connecting primary PCI bus 604 to secondary PCI bus 608. The primary IOP is based on a i960 chip available from Intel Corporation. XOR engine 610 and memory 612 are connected to secondary PCI bus 608. Additionally, IOP 614 and IOP 616 also are connected to secondary PCI bus 608 in the depicted example. IOP 614 and IOP 616 each incorporate a SYMFC920 processor used for PCI to fibre channel I/O. This processor is available from Symbios, Inc., which is located in Fort Collins, Colo. These devices in the depicted example provide a PCI RAID functionality using a fibre channel solution.

In the depicted example, primary IOP 606 includes a RAID ISM to communicate with host processor 602 while the bridge HDM is used by the RAID ISM to communicate with IOP 614 and IOP 616. As can be seen, in the depicted example, the RAID ISM is placed within primary IOP 606 to provide RAID functionality within primary IOP 606 rather than leaving it within IOP 614 or IOP 616. In the depicted example, the fibre channel maintenance is left on IOP 614 and IOP 616. In addition, XOR engine 610 and memory 612 are used by the RAID ISM located on primary IOP 606. This architecture allows for transactions between host processor 602 and IOP 614 and IOP 616. In this manner, workload is split between two IOPs rather than being processed by a single IOP, resulting in improved performance. Additionally, bandwidth in primary PCI bus 604 is increased through the shifting of workload down to secondary PCI bus 608.

Figure 7:
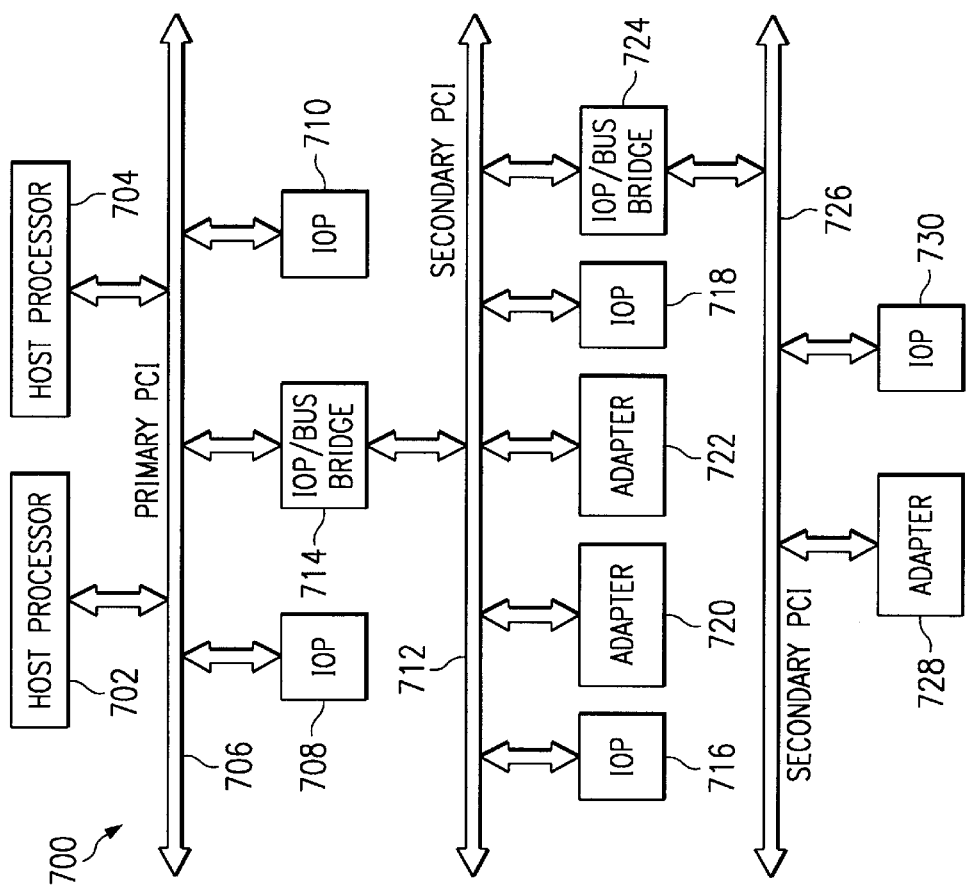
FIG. 7 is a block diagram of a data processing system in accordance with a preferred embodiment of the present invention.

With reference now to FIG. 7, a block diagram of a data processing system is depicted in accordance with a preferred embodiment of the present invention. Data processing system 700 in the depicted example includes two host processors 702 and 704 running various OSMs that communicate through primary PCI bus 706 to one or more of intelligent adapters 708 and 710 attached to primary PCI bus 706. Intelligent adapters 708 and 710 are IOPs incorporating SYMFC920 processors in the depicted example. Additionally, the OSMs may communicate with other intelligent adapters connected to secondary PCI bus 712 through IOP/bus bridge 714, which acts as a bus bridge in addition to providing communications and sharing tasks with secondary input/output processors on intelligent adapters 716 and 718. Intelligent adapters 708, 710, 716, and 718 are dedicated to their own hardware devices while IOP/bus bridge 714 includes a generic processor that can control a number of non-intelligent adapters, such as adapters 720 and 722 on secondary PCI bus 712.

The use of a bridge HDM on IOP/bus bridge 714 provides for a communications interface between primary PCI bus 706 and secondary PCI bus 712, allowing secondary PCI bus 712 to be populated with intelligent adapters along with non-intelligent adapters. Additionally, an additional processor 724 may be employed to provide communication between secondary PCI bus 712 and secondary PCI bus 726 in which non-intelligent adapter 728 and an intelligent adapter 730 are located. As with IOP/bus bridge 714, processor 724 also includes a bridge HDM to enable the communications between the two secondary PCI buses. In this manner, ISMs may be implemented in IOP/bus bridges 714 and 724, which functions with the intelligent adapters on the secondary PCI buses.

Figure 8:
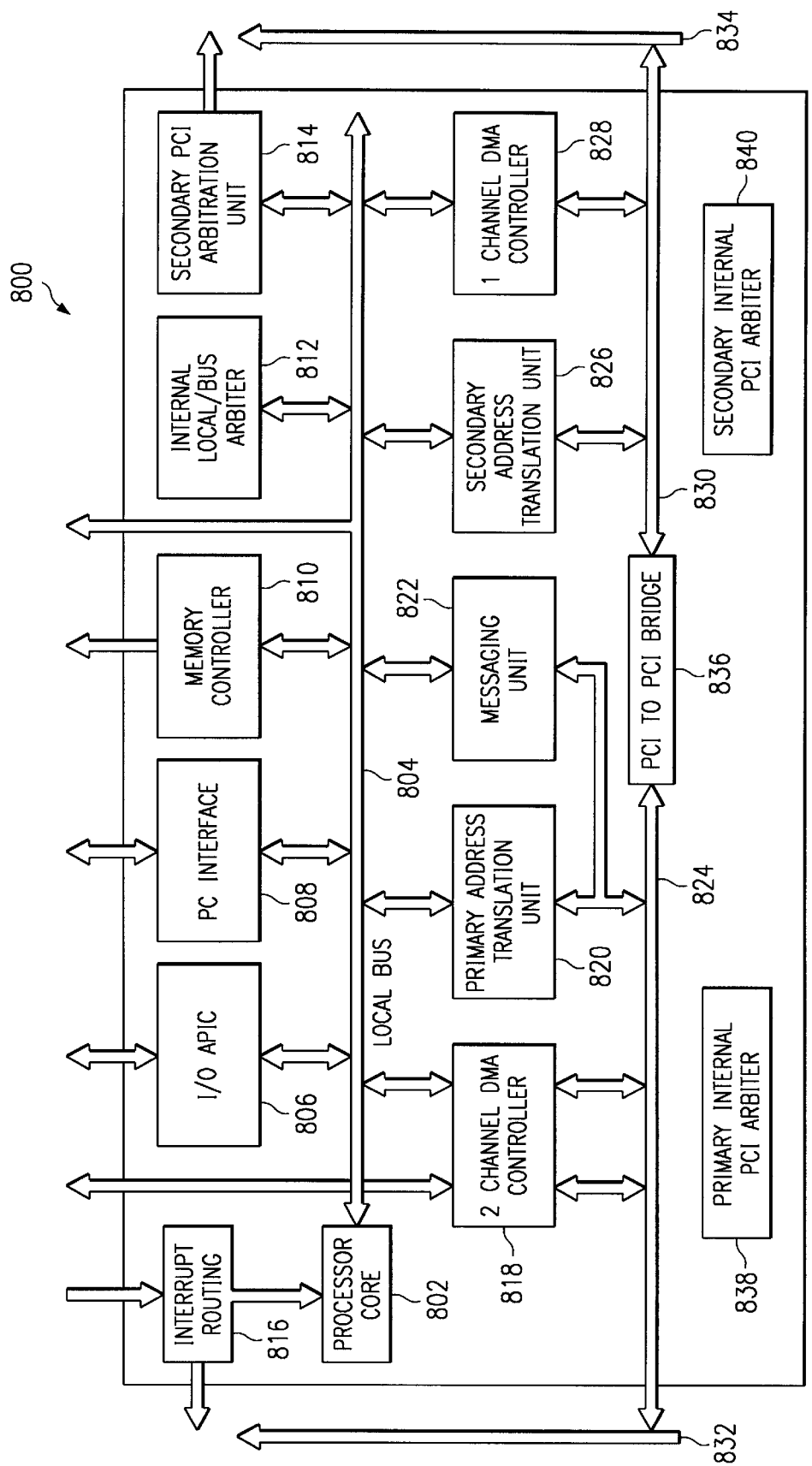
FIG. 8 is a block diagram of a bus bridge in which a preferred embodiment of the present invention may be implemented.

Turning to FIG. 8, a block diagram of a bus bridge is depicted in which a preferred embodiment of the present invention may be implemented. IOP/bus bridge 800 is an example of an IOP/bus bridge, such as IOP/bus bridge 714 or 724 in FIG. 7. IOP/bus bridge 800 includes a processor core 802 in communications with a local bus 804, which connects processor core 802 to a number of components within IOP/bus bridge 800, such as I/O APIC interface 806, PC interface 808, memory controller 810, internal local bus arbiter 812, and secondary PCI arbitration unit 814. Processor core 802 also is coupled to interrupt routing unit 812. IOP/bus bridge 800 also includes a two channel DMA controller 818, a primary address translation unit 820, and a messaging unit 822 all having connections to local bus 804 and primary internal PCI bus 824. A secondary address translation unit 826 and a one channel DMA controller 828 both have a connection to local bus 804 and secondary internal PCI bus 830. Primary internal PCI bus 824 and secondary internal PCI bus 830 are in communication with primary PCI bus 832 and secondary PCI bus 834, respectively. PCI to PCI bridge unit 836 provides communication between primary PCI bus 832 and secondary PCI bus 834. A primary internal arbiter PCI 838 and a secondary internal PCI arbiter 840 also are located within IOP/bus bridge 800. In the depicted example, IOP/bus bridge 800 is representative of an i960 RD I/O processor chip available from Intel Corporation.

Thus, the present invention provides an improved method and apparatus for processing input/output transactions within a data processing system. This advantage is provided by placing intelligent adapters, which may be in the form of IOPs containing input/output processors, on a secondary bus that communicates with a primary IOP that is connected to a primary bus and the secondary bus. The primary IOP also acts as a bus bridge for a primary bus and a secondary bus. Functionality normally performed solely by IOPs on the secondary bus may be placed also within the primary IOP to split up workloads and increase performance on the data processing system.

Additionally, the present invention provides a shifting of workload to the secondary bus, which increases the bandwidth within the data processing system. Furthermore, communications between secondary IOPs and the primary IOP are set up such that the secondary IOPs see the primary IOP as the host processor. This feature is provided in the depicted example by placing a host identifier in messages generated by the primary IOP and sent to the secondary IOP. In turn, these messages are identified such that replies to these messages from the secondary IOP, which are directed to the host, are routed to the primary IOP for processing.

The description of the preferred embodiment of the present invention has been presented for purposes of illustration and description, but is not limited to be exhaustive or limited to the invention in the form disclosed. Many modifications and variations will be apparent to those of ordinary skill in the art. For example, although the terminology was described in terms of the Intelligent Input/Output Architecture Specification and involved PCI buses, the present invention may be applied to other bus architectures involving primary and secondary buses. More specifically, the present invention may be applied to more intelligent adapters other than IOPs. The embodiment was chosen and described in order to best explain the principles of the invention the practical application to enable others of ordinary skill in the art to understand the invention for various embodiments with various modifications as are suited to the particular use contemplated.

What is claimed is:

1. A method for performing functions within a data processing system having a primary bus coupled to a secondary bus by a bus bridge, a host processor coupled to the primary bus and an input/output platform coupled to the secondary bus, the method comprising:

sending messages to the input/output platform from the bus bridge via the secondary bus; and performing functions on the messages sent to the input/output platform from the bus bridge, wherein the functions are shared by the input/output platform and the bus bridge such that a first portion of the functions are performed by the bus bridge and a second portion of the functions are performed by the input/output platform.

2. The method of claim 1, further comprising:

assigning the first portion of the functions to the bus bridge; and assigning the second portion of the functions to the input/output platform.

3. The method of claim 2, wherein the functions are embodied in one or more device drivers and wherein assigning the first portion of the functions and assigning the second portion of the functions includes loading the one or more device drivers.

4. The method of claim 2, wherein the functions are embodied in a device driver and wherein assigning the first portion of the functions and assigning the second portion of the functions includes splitting the device driver to create stackable drivers.

5. The method of claim 1, further comprising:

providing, in the input/output platform, a transport layer, a message layer and a hardware device module; and providing, in the bus bridge, a transport layer, a message layer, an intermediate service module and a bridge hardware device module, wherein the bridge hardware device module provides a communication capability between the host processor and the hardware device module of the input/output platform.

6. The method of claim 5, wherein the bridge hardware device module manages the message layer and the transport layer of the input/output platform.

7. The method of claim 5, wherein the intermediate service module performs functions normally performed by the input/output platform.

8. The method of claim 5, wherein the first portion of the functions is performed by the intermediate service module.

9. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus.

10. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus, wherein the functions that are performed on the messages passed between the primary bus and the secondary bus are shared by the input/output platform and the bus bridge.

11. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus, wherein the functions that are performed on the messages include a first portion of the functions that are performed by the intermediate service module of the bus bridge and a second portion of the functions that are performed by the input/output platform.

12. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus, wherein the functions are embodied in one or more device drivers and wherein the first portion of the functions and the second portion of the functions are assigned to the intermediate service module and the input/output platform, respectively, by loading the one or more device drivers.

13. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus, wherein the bridge hardware device module manages a message layer and a transport layer of the input/output platform.

14. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus, wherein the intermediate service module performs functions normally performed by the input/output platform.

15. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus, wherein the intermediate service module is a redundant array of inexpensive disks (RAID) intermediate service module.

16. A bus bridge for providing communications between a primary bus and a secondary bus, comprising:

an intermediate service module;

a bridge hardware device module; and at least one hardware device module, wherein the at least one hardware device module provides an interface to one or more input/output platforms on the secondary bus, the bridge hardware device module communicates with one or more hardware device modules associated with the one or more input/output platforms, and the intermediate service module performs functions on messages passed between the primary bus and the secondary bus, wherein the bus bridge operates under an intelligent input/output real time operating system.

17. The bus bridge of claim 16, wherein the intelligent input/output real time operating system detects the one or more input/output platforms and loads the one or more hardware device modules associated with the one or more input/output platforms.

18. The bus bridge of claim 17, wherein the intelligent input/output real time operating system loads the one or more hardware device modules by comparing input/output platform descriptions for detected input/output platforms to values stored in a hardware device module descriptor table and loading the one or more hardware device modules identified in the hardware device module descriptor table based on results of the comparing.

19. A method of manufacturing a data processing system, comprising:

providing a host processor coupled to a primary bus;

providing a first secondary processor coupled to the primary bus and a secondary bus, the first secondary processor coupled to the primary bus and the secondary bus; and providing a second secondary processor connected to the secondary bus, wherein a plurality of functions are performed by the second secondary processor and wherein a portion of the functions within the plurality of functions are assigned to the first secondary processor for performance by the first secondary processor such that performance of the portion of the functions by the second secondary processor is absent.

* * * * *